June 9, 1942. E. G. K. ANDERSON 2,285,883
ELECTRICAL FIXTURE
Filed Jan. 23, 1941

Inventor:
Ernst G. K. Anderson
By: Foorman L. Mueller
Atty.

Patented June 9, 1942

2,285,883

UNITED STATES PATENT OFFICE 2,285,883

ELECTRICAL FIXTURE

Ernst G. K. Anderson, Chicago, Ill.

Application January 23, 1941, Serial No. 375,606

6 Claims. (Cl. 174—62)

This invention relates generally to electrical fixtures and in particular to an electrical device for supporting an electrical unit.

The electrical fixtures of the prior art for supporting an electrical unit, in one particular type available commercially, generally include a housing unit adapted to receive therein a power wire which may be common to a plurality of such fixtures supported from a common wire or other structure of a suitable nature. The housing unit for each fixture is usually constructed with closed top and sides having knockout openings therein, but with an open bottom having a cover plate. This is usually formed with an opening substantially centrally thereof for slidably receiving a stem or connecting member. The stem member in this particular type is provided at one end with an engaging portion corresponding to a ball joint engageable with the cover plate about the aperture, and with its opposite end in operative connection with the electrical unit to be supported. The stem and electrical unit are thus supported entirely from the cover plate. In the assembly of the fixture it is necessary that the lead wire usually carried in the stem be suitably spliced or electrically connected to the wire in the housing unit prior to the securing of the cover plate to the housing unit. Since the stem member is mechanically supported only by the cover plate, it is readily apparent that this connection of the wires is accomplished only with considerable difficulty and inconvenience since it is necessary to manually support the stem member during the splicing operation. A further difficulty with these electrical fixtures of the prior art is found in the tendency of the bottom cover plate to become loosened from the housing unit. With the stem member supported only by the cover plate, this loosening of the cover plate drops the electrical unit so that in some instances it is supported entirely by the electrical rather than the mechanical connections in the fixture.

It is an object of this invention, therefore, to provide an improved electrical device.

Another object of this invention is to provide an electrical device for supporting an electrical unit in which the stem member is mechanically supported in the fixture prior to the making of any electrical connections in the fixture.

A further object of this invention is to provide an electrical fixture which is inexpensive in cost, simple and rugged in construction, convenient to assemble, and adapted to withstand hard usage over a long service life.

A feature of this invention is found in the provision of an electrical device which utilizes standard electrical fittings in its assembly so as to reduce manufacturing costs to a minimum.

Another feature of this invention is found in the provision of an electrical fixture for supporting an electrical unit having a housing unit, in which the electrical unit is supported from a supporting bracket secured to the housing unit by means independent of any cover means for the housing unit.

Yet another feature of this invention is found in the provision of an electrical device for supporting an electrical unit in which the relative rotation between the stem member and its support is confined to a limited degree. Any extensive twisting of the wires in the fixture, as by turning of the electrical unit is thus entirely prevented.

Further objects, features and advantages of this invention will become apparent from the following description when taken in connection with the accompanying drawing in which.

Figure 1:
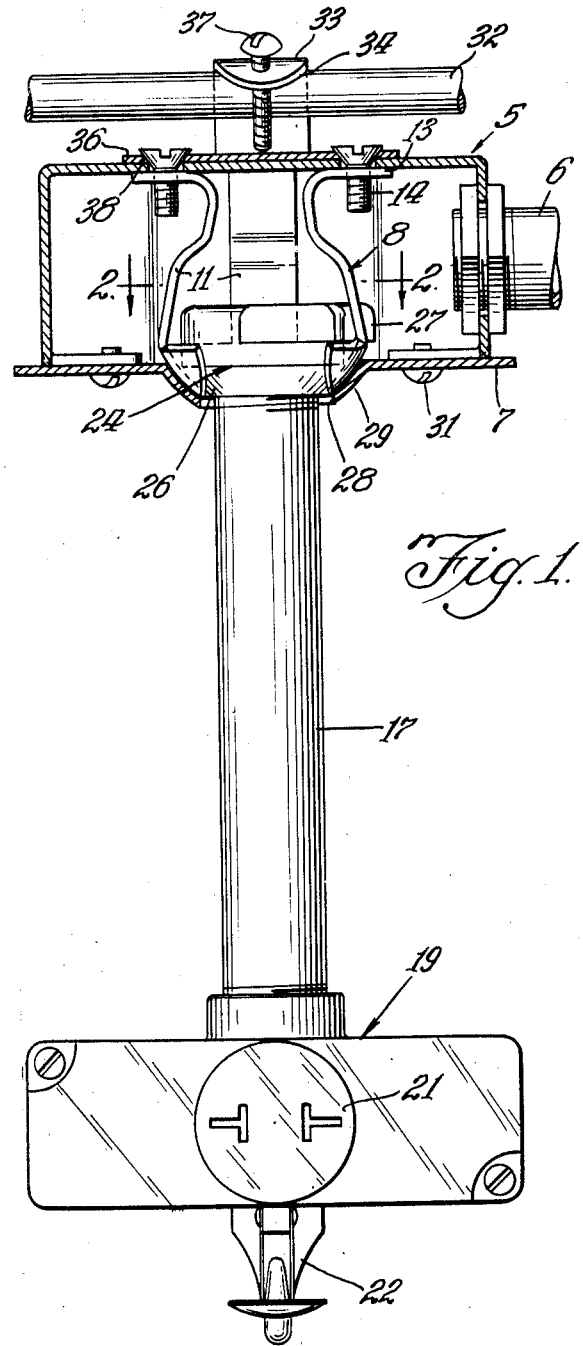
Fig. 1 is a front elevation partly in section showing the complete assembly of the electrical fixture of this invention.

With reference to the drawing the invention is shown in Fig. 1 as including a housing unit 5 which is illustrated as being a standard outlet box, a conduit 6 for carrying a power line or wire (not shown), being connected to the box at one of the outlets. The housing unit 5 is constructed closed at the top and sides thereof but open at its bottom, the bottom being covered by a cover plate 7. Located within the housing or body unit 5 is a bracket member or frame 8 (Fig. 3) which is integrally constructed with a rim-like socket portion 9 having projections or legs 11 projecting upwardly therefrom. The member 8 may be made of sheet metal so as to be readily and easily formed by a stamping operation. Member 8 is formed with an open side (Fig. 2) so that the socket portion 9 is broken or open as indicated at 12. The legs 11 are of somewhat irregular shape inclining inwardly toward their upper ends, with the tops 13 thereof extending laterally outwardly for fitting against the top side of the housing unit 5. Securing of the supporting member 8 to the housing 5 is accomplished by means of screws 14 which are inserted inwardly into the housing 5 from the outside thereof and threadedly engageable with the tops of the legs 11 through threaded apertures 16 formed therein. The bracket member 8 is thus seen to be secured directly to the housing unit 5 and supported independently of the cover plate 7, which will be later described.

A connecting or stem member 17 for the fixture is illustrated in Fig. 1 as having its lower end in operative connection with an electrical device 19 including an electrical socket 21. The socket 21 is in electrical connection with the power line in the housing unit 5 through a lead wire (not shown) which extends through the stem 17. A hook portion 22 on the device 19 is adapted for mechanical connection with an electrical unit (not shown), which is provided with an electric plug adapted to be electrically connected with the socket 21. In threaded engagement with the upper end of the stem 17 is a collar member 24 having a substantially ball or arcuate-shaped portion 26 and a radially extending lug or projection 27 (Figs. 1 and 2), located above the portion 26.

In the assembly of the bracket 8 and the stem member 17 the upper end of the member 17 is inserted into the housing 5 between a side wall thereof and the opening 12 in the bracket 8. Then with the collar 24 lifted to a level above the upper end of the socket portion 9 the stem 17 is moved into the opening or break 12 so as to position the collar 24 within the bracket 8. Upon release of the stem or connecting member 17, therefore, the ball portion 26 drops into a retaining position within the socket portion 9. The supporting member 8 and stem member 17 are thus connected together with the member 17 in a supported position relative to the member 8. Since the bracket 8 is firmly secured to the housing unit 5, this mechanical connection of the fixture is entirely completed prior to any electrical connection thereof. Both hands, therefore, may be freely used in making all of the necessary electrical connections between the wires in the stem member and in the conduit housing 5 without the inconvenience or requirement of supporting the stem member during such electrical connecting operations.

Figure 2:
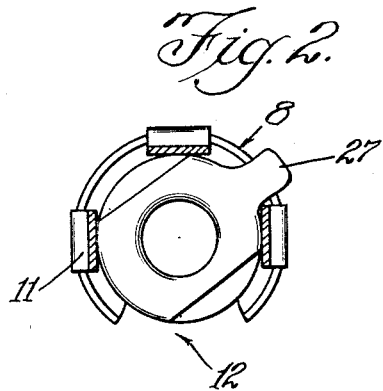
Fig. 2 is a sectional view taken along the line 2—2 in Fig. 1.
Figure 3:
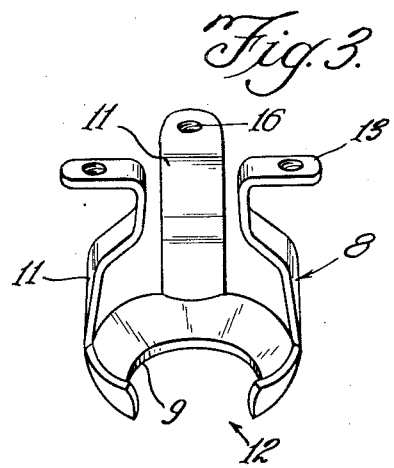
Fig. 3 is a view in perspective of the bracket for supporting the stem member.

As is clearly shown in Fig. 2, the connection of the members 8 and 17 positions the lug 27 of the collar 24 between a pair of adjacent extensions 11 of the bracket member 8. By virtue of this positioning of the lug 27, the degree of rotation of the member 17 relative to the supporting member 8 is limited by the engagement of the lug 27 with such pair of extensions so that any extensive twisting of the wires within the stem member 17 and housing unit 5 and consequent possible damage resulting therefrom, is positively eliminated. It is to be understood that the position of the lug 27 is not limited to a space between any particular pair of extensions 11, since the lug functions equally well to limit the degree of rotation of the member 17 regardless of which adjacent pair of extensions 11 are used.

In the description of the connection of the stem member 17 with the bracket member 8, it has been assumed that the cover plate 7 is removed from the housing unit 5. In the practice of this invention it is contemplated that the plate 7 which has an aperture or opening 28 positioned substantially centrally therein, be slidably positioned about the stem member 17. It is obvious, of course, that this positioning of the plate 7 relative to the stem member 17 is accomplished prior to the connection of the collar member 24 or electrical device 19 with the stem 17. Since the aperture 28 is of a size adapted to permit a free movement of the plate 7 axially of the stem member 17, it is clearly apparent that during the connection of the connecting member 17 with the bracket 8, the cover plate 7 will be in a position substantially adjacent the electrical device 19. That portion 29 of the plate 7 immediately about the aperture 28 is of a curvature corresponding to the curvature of the socket portion 9. When the cover plate 7 is secured to the unit 5, as by screws 31, the portion 29 thereof is positioned opposite the socket portion 9 in a mating relation. It is seen, therefore, that the supporting bracket 8 and the cover plate 7 are independently secured to the housing unit by means of screws 14 and 31, respectively. Thus, in the event the supporting bracket 8 should become broken, or should the screws 14 become loosened, the socket portion 9 will drop into the portion 29 so that the member 17 will then be supported on the cover plate 7. A double protection in the support of the member 17 and hence of the electrical unit is thus provided by virtue of this construction and arrangement of the cover plate 7 and bracket member 8.

In the application of electrical fixtures of the type described, it is common practice to slidably support a plurality of such fixtures from a suspension or messenger wire. The messenger wire is usually of cable form and is generally suspended across a span between the walls of a room, the ends of the wire being secured to the walls or in some instances to the ceiling of the room. As illustrated in Fig. 1 the fixture of this invention is shown as being suspended from a messenger wire 32. This suspension is accomplished by a supporting or bracket member 33 which is integrally constructed with a bent upper portion 34 and a flat base portion 36 adapted to fit on the top of the housing unit 5. The portion 34 is slidably supported on the suspension wire 32, the wire 32 being maintained within the portion 34 by a screw 37. The screw 37 is positioned in the portion 34 and is of a length such as to extend into engagement with the top of the housing unit 5 to form with the bracket 33 an opening for receiving the suspension wire 32. In securing the bracket 33 to the housing, the securing screws 14 for the bracket member 8 are extended through apertures 38 formed in the base portion 36. Since the head portions of the screws 14 are engageable with the bracket portion 36 it is readily apparent that threading of the screws in the bracket 8 connects the bracket members 8 and 33 together and to the top side of the housing unit 5. Application of the fixture for slidable support from a suspension wire is thus cheaply and very simply accomplished.

The invention thus provides an electrical fixture in which the stem member is in a completely supported position when all electrical connections are being made. By virtue of the double protection afforded by the cooperative arrangement of the supporting bracket 8 and cover plate 7, a dropping of an electrical unit supported from the fixture is substantially eliminated. The function of the lug 27 and legs 11 in limiting the degree of rotation of the stem member 17 relative to the bracket member 8 and hence to the housing unit 5 appreciably reduces servicing costs on the fixture, since the electrical unit may be moved about considerably without danger of twisting the wires within the fixture.

Although the invention has been described with reference to one embodiment thereof, it is to be understood that it is not to be so limited, since modifications and alterations thereof can be made which are within the full intended scope of this invention as defined by the appended claims.

I claim:

1. An electrical device including in combination a housing unit having a side wall with a conduit and wire receiving aperture therein, and having a top and a bottom, a socket bracket within the unit having a socket portion and a mounting portion, a fixture including a stem extending through said bottom and having a ball joint portion removably secured at one end thereof positioned in said socket portion, a suspending bracket on the outside of the housing unit having a hook portion for suspending the device from a wire or the like, and means extending through the housing unit top and common to each of said brackets for securing said brackets to said housing top.

2. An electrical device including in combination, a housing unit having a top and a bottom, a socket bracket mounted within said unit having a socket portion with an opening at one side, a fixture including a stem having a ball portion at one end, with said stem movable through said side opening to position the ball portion in the socket portion, and a cover for the bottom of said housing unit having an aperture therein with said stem in said aperture, and means for securing said cover to said housing unit in a position below said socket portion with said aperture aligned therewith, with said cover maintaining said stem and ball portion centered with reference to said socket portion and preventing the removal of the stem through said side opening.

3. In an electrical fixture including an outlet box having a plurality of outlets in the sides thereof each adapted to receive a current supply wire, with the top of said outlet box being closed and the bottom thereof open, a bracket member positioned within said outlet box and integrally formed with a socket portion at one end having a plurality of spaced projections extending upwardly therefrom, said bracket member being open on one side thereof, with the corresponding upper ends of said projections extending laterally outwardly, means connecting the upper ends of said projections to the top wall of said outlet box, a stem member having a ball portion near one end formed with a radially extending lug, with said ball portion being in operative connection with said socket portion to support said stem member from said bracket member, said lug being positioned between an adjacent pair of said extensions, a plate member for covering the bottom of said outlet box having an opening formed substantially centrally thereof for receiving said stem member, with the portion about said opening being of a contour corresponding substantially to the contour of said socket portion, and means for connecting said plate member to said outlet box.

4. In an electrical device including a housing unit having a top side and an open bottom side, a bracket member having a socket portion formed near one end and an opening in one side thereof, said bracket member being positioned within said housing with the opposite end thereof secured to said top side, means for securing said bracket member to said top side, a second member having a portion near one end for mating engagement with said socket portion, said one end of the second member being movable through the opening in the side of said bracket member to operatively connect said mating and socket portions so that said second member is supported from said bracket member, a plate member having an aperture therein for receiving said second member, with the portion of said plate member about said aperture being of a shape corresponding to the shape of said socket portion, said plate member being movable about said second member and into engagement with said housing unit to cover the bottom side thereof, and means for securing said plate member to said housing unit.

5. In an electrical fixture for supporting an electrical unit, said fixture including a housing unit and being adapted to be slidably carried by a suspended longitudinally extending wire, a connecting member having one end in operative connection with said electrical unit, with its opposite end having a ball portion thereon, a bracket member positioned within said housing unit, said bracket member having a socket portion on one end thereof adapted to be operatively connected with said ball portion, with said connection providing for the support of said connecting member from said bracket member, said bracket member at the opposite end thereof being secured to said housing unit, means for suspending said fixture from said wire including a second bracket member slidably supported on said wire and having a base portion secured to said housing unit, and means common to said two brackets for securing said two brackets to said housing unit.

6. An electrical fixture having a housing unit adapted to receive a power wire therein, said housing unit having at least one side thereof open, a bracket member positioned within said housing unit, said bracket member being integrally formed with a socket portion at one end and a plurality of extensions projecting upwardly from said socket portion, said socket portion having an opening therein between a pair of adjacent extensions, means for securing the corresponding upper ends of said extensions to said housing unit, a stem member having a portion near one end thereof for mating engagement with said socket portion, said mating portion having a lug projecting laterally therefrom, and said stem member having a longitudinally extending bore therein for receiving a lead wire, said one end of the stem member being movable through the open side of said housing unit and into said socket opening to operatively connect said mating and socket portions to support said stem member from said bracket member, and providing for the electrical connecting of said power and lead wires after said operative connection has been effected, said lug being positioned between a pair of adjacent extensions and limiting the degree of rotation of said stem member relative to said bracket member to prevent any twisting of said wires, a plate member having an aperture therein for slidably receiving said stem member, with the portion of said plate about said aperture corresponding in curvature to the curvature of said socket portion, said plate member being movable about said stem member and into engagement with said housing unit, and means for securing said plate member to said housing unit.

ERNST G. K. ANDERSON.